United States Patent [19]

Grabow et al.

[11] 4,336,006
[45] Jun. 22, 1982

[54] GEAR POSITIVE DISPLACEMENT MACHINE WITH GAPS BETWEEN BEARING MEMBERS AND HOUSING

[75] Inventors: Kurt Grabow, Feucht; Willy Mahl, Ditzingen; Karl-Heinz Müller, Vaihingen; Heinrich Kochendörfer, Kernen; Dieter Bertsch, Neuhausen; Siegfried Mayer; Jörg Anhenn, both of Vaihingen; Wilhelm Dworak, Stuttgart, all of Fed. Rep. of Germany

[73] Assignee: Robert Bosch GmbH, Stuttgart, Fed. Rep. of Germany

[21] Appl. No.: 82,995

[22] Filed: Oct. 9, 1979

[30] Foreign Application Priority Data

Nov. 11, 1978 [DE] Fed. Rep. of Germany ....... 2848994

[51] Int. Cl.³ .................. F01C 1/18; F01C 21/02; F16C 23/04
[52] U.S. Cl. .................. 418/131; 418/206; 308/72
[58] Field of Search ........... 418/131, 132, 134, 135, 418/205, 206; 308/72

[56] References Cited

U.S. PATENT DOCUMENTS

| 465,691 | 12/1891 | Burns | 308/72 |
| 2,228,394 | 1/1941 | Marvin et al. | 308/72 |
| 2,295,139 | 9/1942 | Topanelian, Jr. | 308/72 |
| 2,421,685 | 6/1947 | Crot et al. | 308/72 |
| 3,574,492 | 4/1971 | Schwary | 418/206 |
| 3,602,616 | 8/1971 | Jung | 418/206 |
| 3,766,792 | 10/1973 | Braun et al. | 308/72 |
| 3,778,202 | 12/1973 | Lindsay et al. | 418/206 |
| 3,876,264 | 4/1975 | McCloskey | 308/72 |
| 4,056,337 | 11/1977 | Zorn et al. | 418/131 |

FOREIGN PATENT DOCUMENTS 3053 2/1916 United Kingdom .............. 308/72

Primary Examiner—John J. Vrablik
Attorney, Agent, or Firm—Michael J. Striker

[57] ABSTRACT

A gear positive displacement machine has a housing, two gear members, and two bearing members supporting the latter. A gap is formed between an inner wall of the housing and a respective one of the bearing member, the gap increasing in two opposite axial directions. It may start from a central transverse plane of the bearing member. The gap may be formed by a convex peripheral surface of the bearing member or by a convex inner wall of the housing.

9 Claims, 4 Drawing Figures

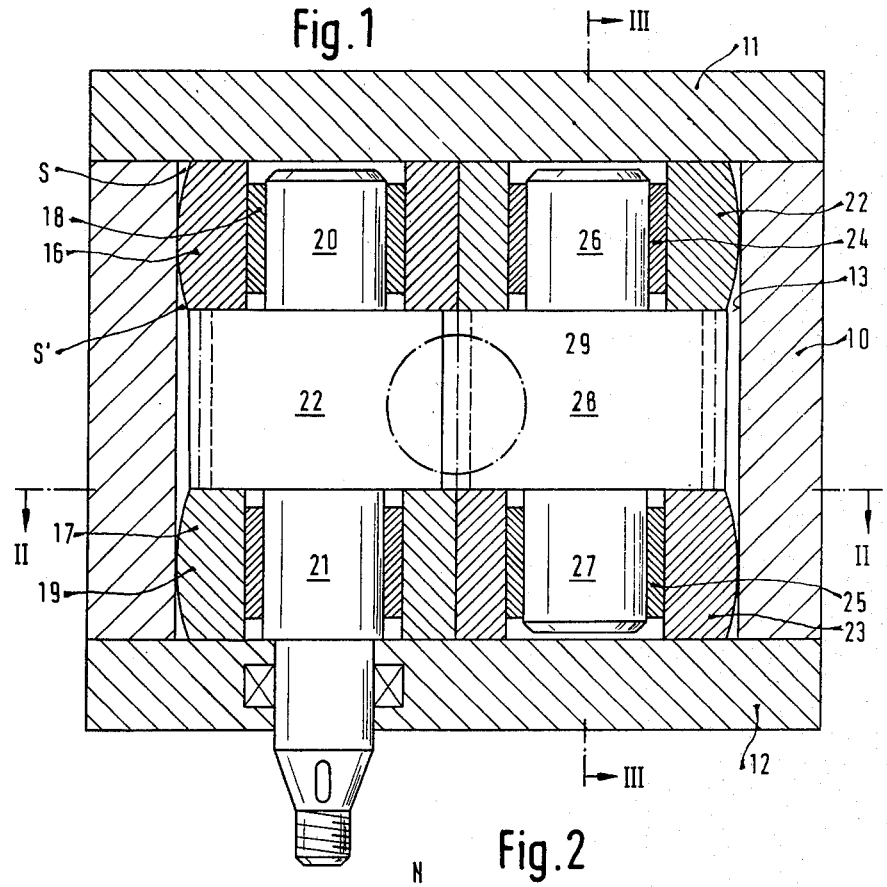
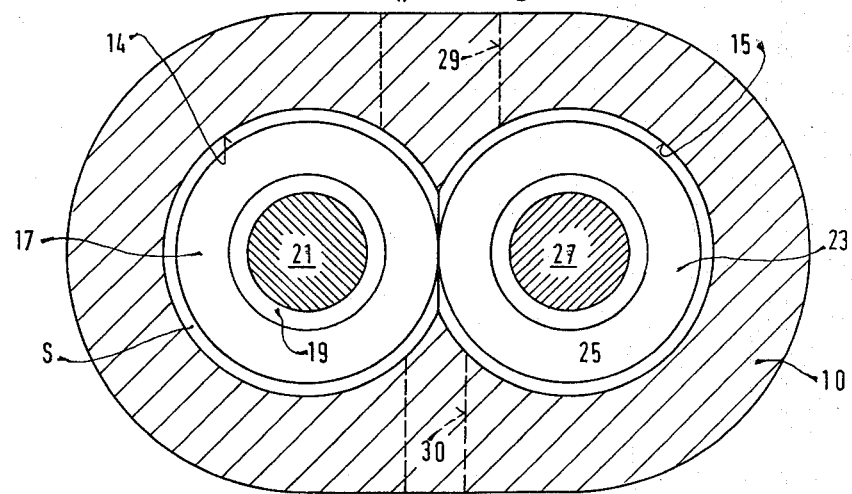

GEAR POSITIVE DISPLACEMENT MACHINE WITH GAPS BETWEEN BEARING MEMBERS AND HOUSING

BACKGROUND OF THE INVENTION

The present invention relates to a gear positive displacement machine, such as a gear hydraulic pump or a gear hydraulic motor.

Gear positive displacement machines are known in the art, in which a gap is formed between the peripheral face of the bearings and an adjacent inner wall of a housing. This gap uniformly or non-uniformly increases in a direction from a cover which closes the housing, toward the lateral face of the gears, i.e. in one axial direction. In such a construction, the deformation of the bearings under load does not detrimentally affect the lateral wear of the end faces of the bearings under the action of the gears. However, the known construction has the disadvantages that when the gear shafts bend during the operation the bearings cannot exactly follow the bending line of the shafts.

SUMMARY OF THE INVENTION

Accordingly, it is an object of the present invention to provide a gear positive displacement machine which avoids the disadvantages of the prior art.

More particularly, it is an object of the present invention to provide a gear positive displacement machine which not only eliminates the above-mentioned lateral wear of the bearings, but also provides for adjustment of the bearings to the bending line of the gear shafts.

In keeping with these objects and with others which will become apparent hereinafter, one feature of the present invention resides, briefly stated, in a gear positive displacement machine in which a gap between inner walls of a housing and a peripheral face of each of bearings has an increasing shape in two opposite axial directions at at least low pressure zone of the machine.

In such a construction, the bearings are automatically adjusted to the bending line of the gear shafts of the machine during the operation.

The gap may increase in the two opposite axial directions starting from a central transverse axis of the peripheral face of the bearings.

In accordance with another feature of the present invention, the gap may be formed by the convex peripheral face of the bearing members. However, the gap may also be formed by the convex inner wall of the housing.

In accordance with a further feature of the present invention, the gap may be formed by a spherical face of the bearings or the housing. It is also possible that this face is double conical.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a longitudinal section of a gear positive displacement machine in accordance with the present invention;

FIG. 2 is a section taken along line II—II of FIG. 1;

DESCRIPTION OF PREFERRED EMBODIMENTS

Figure 3:
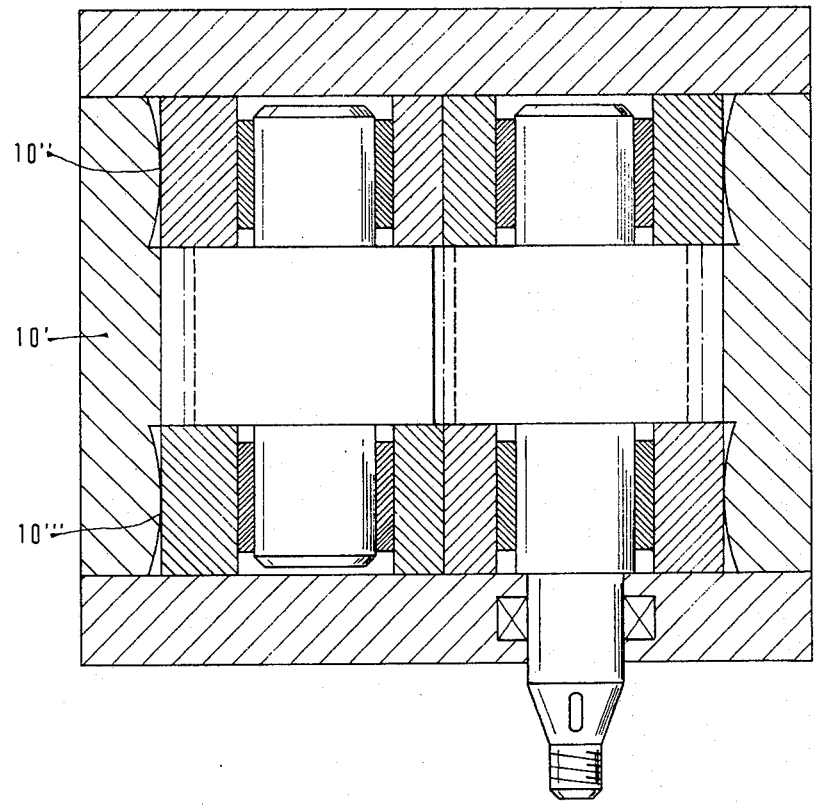
FIG. 3 is also a longitudinal section of the gear positive displacement machine in accordance with another embodiment of the present invention.

A gear positive displacement machine, such as a gear hydraulic pump or a gear hydraulic motor, in accordance with the present invention has a housing 10 having an inner through-going recess 13 which is closed at its sides by covers 11 and 12. The inner recess 13 is formed by two through-going openings 14 and 15 which overlap one another and are parallel to each other. Thereby the recess 13 has a cross-section corresponding in shape to number eight.

Two bush-shaped bearings 16 and 17 are located in the opening 14 coaxial to one another. Bushings 18 and 19 are pressed in the bearings 16 and 17 respectively. Shaft journals 20 and 21 of a gear 22 are supported in these bushings. The shaft journal 21 extends outwardly beyond the housing and serves as a driving element of a gear pump.

Two bush-shaped bearings 22' and 23 are located in the opening 15. Bushings 24 and 25 are pressed in these bearings. Shaft journals 26 and 27 of a gear 28 are supported in the bushings 24 and 25. The gear 28 meshes with the gear 22. The bushings have faces which face toward one another and are provided with flattenings. The bushings abut against one another over the flattenings. A passage 29 at the height of the gears extends into the recess 13 from one side which is a low pressure side of the machine. A passage 30 extends into this recess from the other side which is a high pressure side of the machine. The bush-shaped bearings have outer convex surfaces so as to form gaps S and S' each of which increasingly widens both to a respective one of the covers and to one lateral face of a respective one of the gears. Advantageously, the convexity extends over the entire outer surface of the bearings, with the exception of the flat lateral faces. They may be formed, however, only at the lower pressure side N of the machine, at which the passage 29 is provided.

The magnitude of the convexity of the bearings is, naturally, considerably enlarged in the drawing. In practice, it amounts to only several hundredth millimeter. The bearings extend outwardly beyond the outer diameter of the gears by the magnitude of the convexity. When the gear shafts bend, the bearings can effectively follow the bending line of the shafts. This provides for the following advantages.

When no specific measures are taken, the bearings which are subjected to the action of forces applied by the shafts, are so deformed that they insignificantly elongate and rub against the lateral faces of the gears. Thereby the lateral faces are worn by rubbing, which results in leakage losses. This is prevented in the inventive construction.

Each of the gaps S and S' widens in two opposite axial directions. More particularly, it widens gradually from a central transverse plane of the bearings, the plane extending transversely to the axial direction.

As can be seen from FIG. 3, the convexity may also be provided in a housing 10' of the machine. The bearings are here cylindrical whereas adjacent zones 10'' and 10''' of the housing are convex and formed in recesses of the housing. The convexity of the constructions shown in FIGS. 1 and 3 is spherical.

Figure 4:
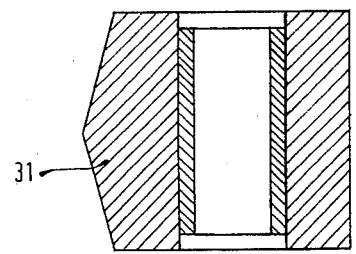
FIG. 4 is a bearing of the gear shaft of the machine in accordance with a further embodiment of the present invention.

As can be seen from FIG. 4, the outer contour of a bearing which is identified here by reference numeral 31, is double-conical. The effect of such a bearing member is analogous. However, bearing force is advantageous in the case of the spherical bearing. A combination of both above-mentioned contours is also possible.

It will be understood that each of the elements described above, or two or more together, may also find a useful application in other types of constructions differing from the types described above.

While the invention has been illustrated and described as embodied in a gear positive displacement machine, it is not intended to be limited to the details shown since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A gear positive displacement machine, comprising a housing having an inner wall; two gear members in said housing each having an axis and a shaft forming said axis, said gear members radially abutting against and meshing with one another, said gear members together with said housing defining a low pressure side and a high pressure side; bearing members in said housing and arranged for bearing said shafts of said gears, each of said bearing members having a peripheral face which together with said inner wall of said housing forms a gap at least at said low pressure side, said gap increasing in two axially opposite directions starting from a central transverse axis of said bearing members so that when said shafts of said gears bend during the operation, said bearing members exactly follow the bending line of said shafts.

2. A machine as defined in claim 1, wherein said bearing members are annular.

3. A machine as defined in claim 1, wherein said peripheral face of each of said bearing members forms a first face, and said inner wall of said housing has a second face facing toward said first face, one of said first and second faces being convex so as to form said gap increasing in said two axially opposite directions.

4. A machine as defined in claim 3, wherein said one face is spherical.

5. A machine as defined in claim 3, wherein said one face is double-conical.

6. A machine as defined in claim 3, wherein said one convex face is formed by said peripheral face of each of said bearing members.

7. A machine as defined in claim 3, wherein said peripheral face of each of said bearing members has a flat section by which it abuts against the flat section of the other bearing member, said peripheral face of each of said bearing members being convex over the entire circumference thereof, so as to form said gap increasing in said two axially opposite direction, with the exception of said flat section.

8. A machine as defined in claim 3, wherein said one convex face is formed by said second face of said inner wall of said housing, said peripheral wall of said bearing members being cylindrical.

9. A machine as defined in claim 8, wherein said housing has recesses having bottom faces each of which forms said one convex face.

* * * * *